United States Patent [19]

Goswami et al.

[11] Patent Number: 5,687,706
[45] Date of Patent: Nov. 18, 1997

[54] PHASE CHANGE MATERIAL STORAGE HEATER

[75] Inventors: D. Yogi Goswami; Chung K. Hsieh; Chand K. Jotshi; James F. Klausner, all of Gainesville, Fla.

[73] Assignee: University of Florida, Gainesville, Fla.

[21] Appl. No.: 428,905

[22] Filed: Apr. 25, 1995

[51] Int. Cl.⁶ .................. F24H 7/00; F28D 20/00
[52] U.S. Cl. .............. 126/263.01; 126/400; 165/104.17; 165/902
[58] Field of Search .................. 126/400; 165/10, 165/104.15, 14.17, 902

[56] References Cited

U.S. PATENT DOCUMENTS

| | | |
|---|---|---|
| 2,791,204 | 5/1957 | Andrus . |
| 2,911,513 | 11/1959 | MacCracken . |
| 3,163,209 | 12/1964 | Shinn ........................ 165/902 |
| 3,225,820 | 12/1965 | Riordan . |
| 3,390,717 | 7/1968 | Townsend . |
| 3,721,101 | 3/1973 | Sheppard et al. . |
| 3,773,031 | 11/1973 | Laing et al. . |
| 4,153,047 | 5/1979 | Dumbeck ................... 126/400 |
| 4,176,655 | 12/1979 | Levy . |
| 4,182,398 | 1/1980 | Salyer . |
| 4,212,346 | 7/1980 | Boyd . |
| 4,246,466 | 1/1981 | Rice et al. ................. 126/400 |
| 4,259,198 | 3/1981 | Kreibich et al. ........... 126/400 |
| 4,403,645 | 9/1983 | MacCracken . |
| 4,544,028 | 10/1985 | Chase ........................ 126/400 |
| 4,579,170 | 4/1986 | Moses et al. . |
| 4,587,404 | 5/1986 | Smith . |
| 4,807,696 | 2/1989 | Colvin et al. . |
| 4,911,232 | 3/1990 | Colvin et al. . |
| 4,924,935 | 5/1990 | Van Winckel . |
| 4,979,923 | 12/1990 | Tanaka . |

FOREIGN PATENT DOCUMENTS

| | | |
|---|---|---|
| 0174694 | 10/1982 | Japan . |
| 0203111 | 12/1982 | Japan . |
| 0076911 | 5/1983 | Japan . |
| 0304000 | 12/1990 | Japan . |
| 604-196 | 4/1978 | U.S.S.R. . |
| 666-521 | 6/1979 | U.S.S.R. . |

Primary Examiner—Carl D. Price
Attorney, Agent, or Firm—Needle & Rosenberg, P.C.

[57] ABSTRACT

A storage heater for storing heat and for heating a fluid, such as water, has an enclosure defining a chamber therein. The chamber has a lower portion and an upper portion with a heating element being disposed within the enclosure. A tube through which the fluid flows has an inlet and an outlet, both being disposed outside of the enclosure, and has a portion interconnecting the inlet and the outlet that passes through the enclosure. A densely packed bed of phase change material pellets is disposed within the enclosure and is surrounded by a viscous liquid, such as propylene glycol. The viscous liquid is in thermal communication with the heating element, the phase change material pellets, and the tube and transfers heat from the heating element to the pellets and from the pellets to the tube. The viscous fluid has a viscosity so that the frictional pressure drop of the fluid in contact with the phase change material pellets substantially reduces vertical thermal convection in the fluid. As the fluid flows through the tube heat is transferred from the viscous liquid to the fluid flowing through the tube, thereby heating the fluid.

17 Claims, 2 Drawing Sheets

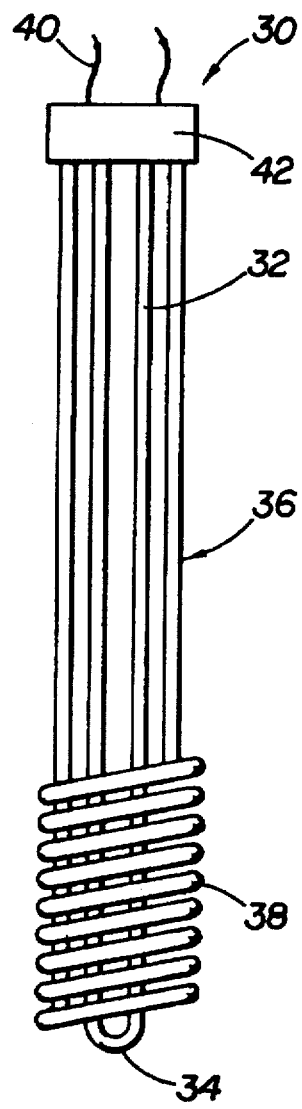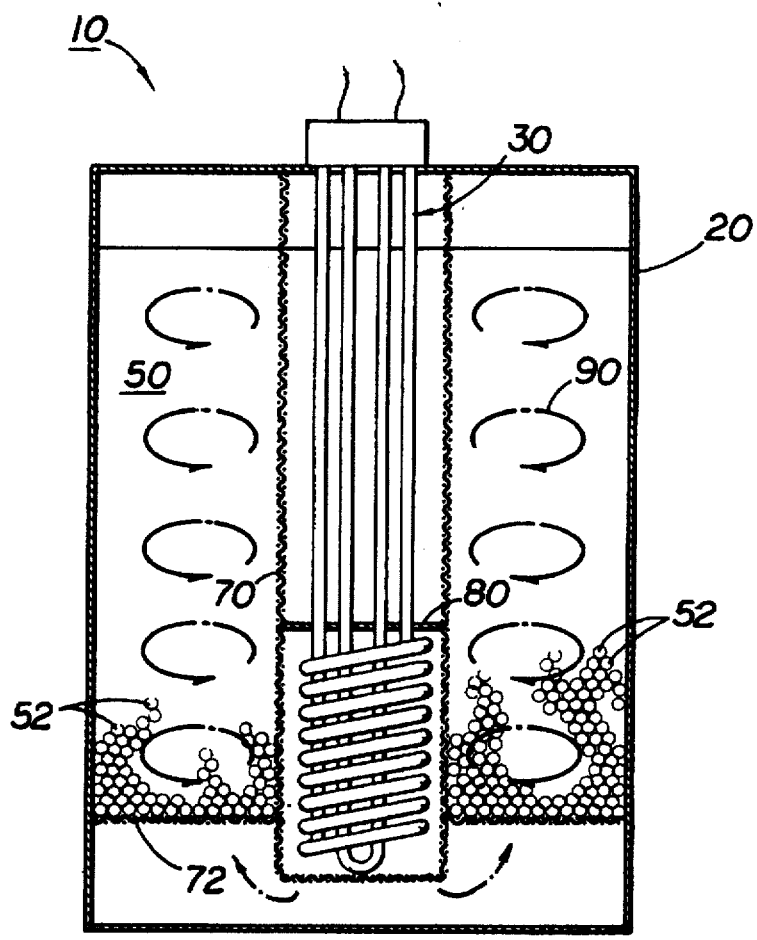
FIG 3
FIG 4

PHASE CHANGE MATERIAL STORAGE HEATER

BACKGROUND OF THE INVENTION

1. Field of the Invention

The present invention relates generally to heat storage devices, and in particular to electrically heated water heaters utilizing encapsulated phase change materials to store heat.

2. Description of the Prior Art

Storage heaters have long been used to store heat during periods when energy is inexpensive or readily available and to recover heat for use at a later time, when energy is more expensive or less available. Such heaters can be used to store heat in residential applications, such as in water heaters, and in industrial applications, such as in bulk liquid heaters used in the chemical industry. Typically, a storage heater has some sort of heat storage means and a heat recovery means that carries the stored heat away as it is used. During use, heat is transferred from the storage means to the recovery means via some system of heat transfer.

One type of heat storage heater employs a phase change material (PCM). A PCM is a material that is in the solid phase at low temperatures and the liquid phase at high temperatures. As a PCM is heated its temperature increases until it reaches its melting temperature. At its melting temperature, the PCM remains in the solid phase while it absorbs a fixed mount of heat known as the "latent heat of fusion" (also called "latent heat of crystallization"). Once the PCM absorbs the latent heat of fusion it changes phase from solid to liquid. As heat is removed from a PCM, its temperature decreases until it reaches the PCM's melting temperature. At this point, the PCM stays in the liquid phase until it releases an amount of heat equal to the latent heat of fusion. As the PCM continues to loose heat, the PCM will change from the liquid phase to the solid phase. The characteristic of absorbing and releasing the latent heat of fusion allows a PCM to store relatively large amounts of heat without having to be heated to correspondingly high temperatures. Furthermore, it allows a given volume of PCM to store relatively more heat, at a given temperature, than the same volume of a single-phase material with a similar heat capacity.

The prior art has several heat storage devices employing PCMs as heat storage means. U.S. Pat. No. 4,403,645 issued to MacCracken discloses a PCM heat storage/transfer device having a heat exchanger tube surrounded by unencapsulated phase change material. A pump is provided to circulate the PCM, while in its liquid state, around the tube to prevent stratification of the PCM.

U.S. Pat. No. 2,791,204 issued to Andrus discloses a water heater containing a non-encapsulated heat storage medium such as a salt. It has a coiled heat recovery conduit placed within the tank as a heat recovery unit. A gas burner is disposed at the bottom of the tank. As the salt is heated, it melts and remains in the liquid state to store heat. As heat is transferred to the coiled conduit, the salt crystallizes and transfers heat of crystallization to the conduit.

U.S. Pat. No. 3,773,031 issued to Laing et al. discloses a device for storing heat or cold having a tank containing a liquid which flows through the tank and a fusible heat storage material disposed in one or more containers, and a cooling or heating system which is subjected to heat exchange only with the liquid in the tank. In one embodiment, a water heater is constructed having an insulated tank formed by a pair of walls which are joined together by a flange and insulated to form a thermal insulation barrier. A hollow tube extends from an upper corner of the tank towards a diagonally opposite corner to a compartment having perforated dividing walls. An electrical resistance heat source is included in this compartment. Water enters the compartment through a service water inlet fitting. The hollow tube has a second tube therein with an opening at its end through which heated service water may be withdrawn through an outlet fitting. Heat storage material such as barium hydroxide octahydrate is used in the tank. The heat storage material is packed in ball-shaped containers, preferably made of a resistant material such as stainless steel. Cold water enters the compartment formed by the perforated dividing walls where it is heated by the electrical resistance element. The perforated walls serve to prevent contact of the element with the balls containing the heat storage material. The heated water then rises by convection through the spaces between the balls to the top portion of the tank, where it is removed by the second tube.

U.S. Pat. No. 4,807,696 issued to Colvin et al. discloses a PCM heat storage device employing a pumpable slurry. Colvin et al. is directed to a direct contact thermal energy storage unit containing PCMs. The thermal storage apparatus comprises a housing defining a chamber including spaced-apart inlet and outlet means communicating with the chamber. Fluid from a heat source is transferred to the energy storage apparatus, where the thermal energy is transferred to the storage apparatus as a result of a thermal gradient between the fluid and the storage apparatus. Disposed within the chamber is a channelling means including a plurality of elongate passages, which may take the form of an elongate honeycomb matrix having passages parallel with the inlet and outlet means. The thermal energy storage and releasing means comprises a plurality of macrocapsules having an encapsulating outer shell. Coarse and fine stainless steel wire mesh screens are located at both ends of the honeycomb, and at intervals in between, to prevent blocking or clogging of the inlet or outlet means by microcapsules. The fluid from the heat source is pumped through the inlet means and screens where it is divided into a number of flow streams as defined by the channeling means. The fluid contacts the macrocapsules, which transfer heat energy between the macrocapsules and the fluid.

U.S. Pat. No. 4,587,404 issued to Smith is directed to a process for creating a thermal storage heat sink. A salt mass comprising a mixture of sodium and lithium carbonates is heated in an essentially spherical fusion cell made of high-temperature corrosion-resistant material. To begin the heating of the salt mass, an electrically conducting pilot layer is added on top, comprising buoyant, electrically conductive materials. Heating is accomplished by injecting electrical energy directly into the salt mass. Current starts to flow in the pilot layer, which causes the adjacent salt itself to melt. The salt mass comprising the sodium and lithium carbonates then begins to conduct and is heated by its own resistance.

None of the above-disclosed devices naturally inhibit vertical convection. Heat applied to the bottom of these devices naturally rises to the top of the device, thereby stratifying the heat storage materials. Because of this, the storage material at the bottom of these devices tends to be under-used, thereby decreasing the overall efficiency of the storage device. Some of these devices attempt to overcome stratification by circulating the storage material, or a fluid in contact with the storage material, with a pump. However, employing a pump increases the complexity of the device while decreasing its efficiency.

Thus there exists a need for a heat storage device that uniformly stores heat throughout the device without requiring additional moving parts.

SUMMARY OF THE INVENTION

The present invention is a storage heater for storing heat for later use in heating a fluid. It comprises an enclosure, having a lower portion and an upper portion. A heating element, disposed within the enclosure, adds heat to the enclosure. A densely packed bed of PCM pellets disposed within the enclosure stores the heat, and a tube, which passes through the densely packed bed of PCM pellets, recovers heat from the densely packed bed of PCM pellets and transfers heat to the fluid being heated. A viscous liquid surrounding the PCM pellets, in thermal communication with the heating element, the PCM pellets, and the tube, transfers heat from the heating element to the pellets, while in the heat storing mode, and from the pellets to the tube, while in the heat recovery mode.

The heating element is a variable heat flux heating element capable of transferring heat to the lower portion of the enclosure at a greater rate than the rate at which it transfers heat to the upper portion of the enclosure and may comprise an electrical heating dement. The heating element has a vertically disposed first member having a distal end and a second member extending about a portion of the first member adjacent the distal end. The lower potion produces more heat per unit length than the vertical portion so that more heat is produced in the lower portion of the enclosure than in the upper portion of the enclosure.

The tube through which the fluid to be heated flows has an inlet and an outlet disposed outside of the enclosure. An intermediate potion of the tube, interconnecting the inlet and the outlet, passes through the enclosure so that as the fluid flows through the tube, heat is transferred from the viscous liquid to the fluid flowing through the tube. The tube also comprises a coil disposed within the enclosure and around the heating element.

The PCM pellets store heat in the form of latent heat of fusion. The PCM pellets may be made of any material having suitable latent heat of fusion and a suitable melting temperature. Such materials include high density polyethylene. Nucleation agents may be added to the PCM to prevent supercooling. For example, sodium hydroxide may be added to trisodium phosphate dodecahydrate, and calcium fluoride may be added to ammonium alum to form nucleation agents.

The viscous fluid is chosen to have a high heat transfer characteristic and a viscosity that causes the frictional pressure drop of the fluid in contact with the PCM pellets to reduce vertical thermal convection in the fluid while not reducing radial heat transfer. One such fluid is propylene glycol. For water heating applications where humans and animals would come in contact with the heated water, the PCM and the viscous fluid should be non-toxic substances.

A filtering means, such as a wire mesh disposed around the heating element, prevents the PCM pellets from contacting the heating element while allowing the viscous fluid to contact it. This allows the heating element to heat the PCM-free fluid near the heating element to a higher temperature than would be possible if the PCM pellets were to contact the heating element. Otherwise, the PCM pellets would melt onto the heating element, thereby reducing its heating efficiency.

A baffle plate, laterally disposed near the lower portion of the chamber, creates eddy currents in the viscous liquid. The plate defines a plurality of openings and a lip is disposed adjacent each opening to deflect the path of travel of the fluid as it passes through the opening. This encourages radial heat transfer and reduces thermal stratification within the enclosure.

In the preferred embodiment, the invention is a storage water heater that comprises an enclosure filled with pellets made of cross-linked high density polyethylene (HDPE). (The cross-linking process involves exposing the pellets to a source of neutrons, thereby making the form of the HDPE pellets stable so that on melting, the pellets retain their shape.) The average diameter of the pellets is at least $5 \times 10^{-3}$ meters and the concentration of the pellets in the bed is at least 40% (67% preferably) by volume of the bed. The pellets are surrounded by a viscous fluid, such as propylene glycol. Other viscous fluids, having a high viscosity and a high heat characteristic may be employed. An electrical heating unit extending down through the central axis of the water heater is used to add heat to the system. A mesh, or other screen, surrounding the heating unit prevents contact by the PCM elements with the heating unit. A coiled water tube extends helically down and back up through the PCMs in the enclosure for removing heat from the system thereby heating the water.

It is an object of the present invention to employ PCM pellets in a storage heater that uniformly heats all of the pellets.

It is a further object of the present invention to reduce vertical convection in a PCM storage heater.

It is a further object of the present invention to reduce stratification in a PCM storage heater without employing a pump.

These and other objects will become apparent from the following description of the preferred embodiment taken in conjunction with the following drawings, although variations and modifications may be effected without departing from the spirit and scope of the novel concepts of the disclosure.

BRIEF DESCRIPTION OF THE FIGURES OF THE DRAWINGS

FIG. 3 is a side elevation view of the heating element.

FIG. 4 is a side schematic view of a storage heater in accordance with the present invention showing vertically suppressed convection currents.

DETAILED DESCRIPTION OF THE INVENTION

Figure 1:
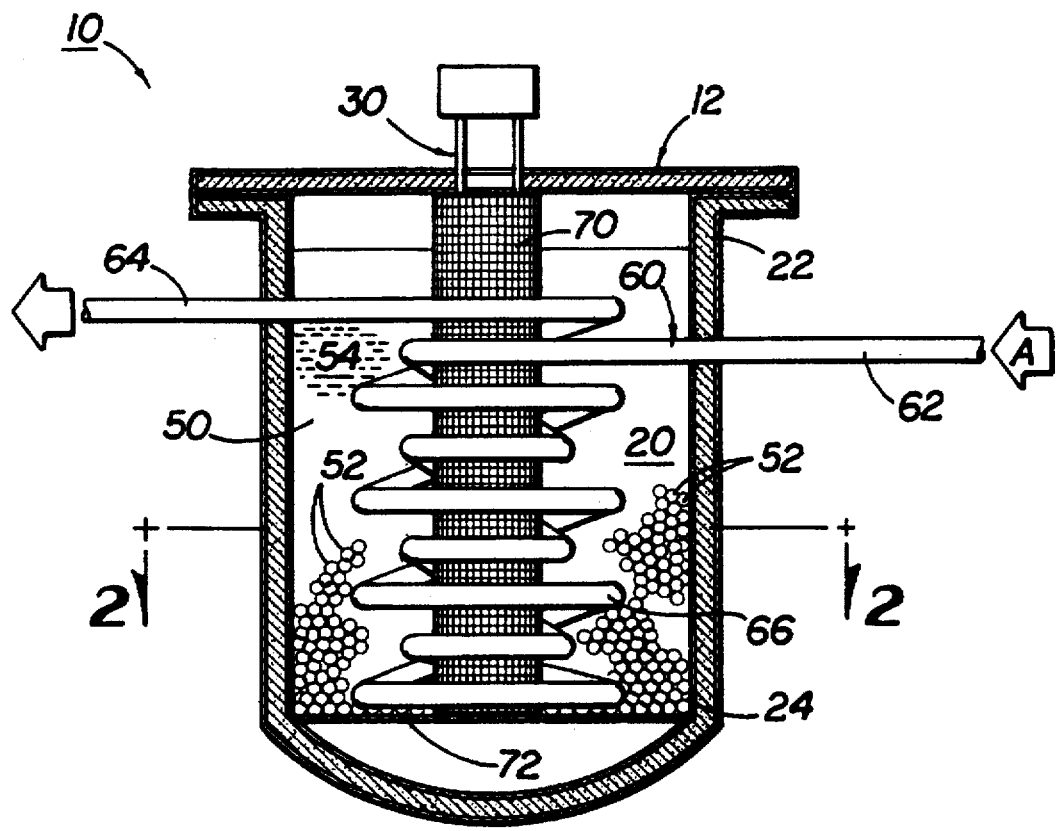
FIG. 1 is a side schematic view of a storage heater in accordance with the present invention.

A preferred embodiment of the invention is now described in detail. Referring to the drawings, like numbers indicate like parts throughout the views.

Figure 2:
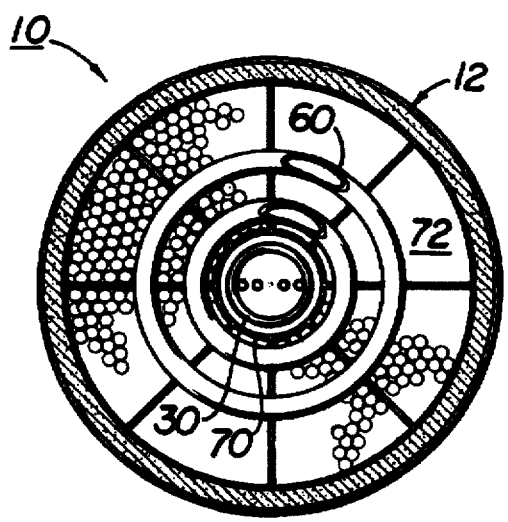
FIG. 2 is a cross section along line 2—2 in FIG. 1.

Referring to FIGS. 1 and 2, the present invention 10 comprises an insulated enclosure 12 defining a chamber 20, having an upper portion 22 and a lower portion 24. A heating element 30, for adding heat to the chamber 20, is vertically disposed within the chamber 20. A tube 60, having an inlet 62 and an outlet 64, both disposed outside of the enclosure 12, passes through the enclosure 12 and has an intermediate portion 66, interconnecting the inlet 62 and the outlet 64, helically disposed about a portion of the heating element 30 inside the chamber 20.

In one preferred embodiment, the dimensions of the storage heater are as follows: the diameter of the chamber 20 is 20 in., the height of the chamber is 36 in., the length of the tube 60 is 100 ft., comprising three loops having diameters of 6 in., 10 in., and 14 in., respectively. The diameter of the heating element 30 is 3 in. This results in a storage heater whose enclosure 12 has a capacity of about 40 gal.

Disposed within the enclosure is a stationary packed bed 50 of PCM pellets 52 (for the purpose of clarity, only a representative number of the PCM pellets 52 are shown in FIG. 1) surrounded by a viscous liquid 54, such as propylene glycol. Propylene glycol is used because it is nontoxic, it has a good heat transfer characteristics and it remains viscous at high temperatures. The average diameter of the PCM pellets 52 is about $5\times10^{-3}$ meters. This diameter is chosen because it provides a high heat transfer surface area, while maintaining the stationary nature of the bed 50. The concentration of the PCM pellets 52 should be at least 40% of the volume of the bed 50 and preferably about 67%. This concentration ensures that the bed 50 will remain stationary and not act as a slurry.

It is important that bed 50 remain stationary and that a the liquid 54 surrounding the PCM pellets 52 be of sufficient viscosity so that the frictional pressure drop of the viscous liquid 54 exceeds gravitational pressure gradient, thereby dampening any natural vertical convection in the bed 50. By dampening the vertical component of convection, more heat is transferred through radial convection and conduction. This ensures that the upper portion 22 and the lower portion 24 of the chamber 20 receive equivalent amounts of heat.

While in the heating mode, heat is generated by the heating element 30 and transferred by the viscous liquid 54 to PCM pellets 52 in the packed bed 50. The cores of the PCM pellets 52 increase in temperature until they begin to melt into the liquid phase, at about temp up 140° C. While melting, the PCM pellets 52 absorb latent heat of fusion and the temperature of the PCM pellets 52 remains relatively constant. Once substantially all of the PCM pellets 52 have melted, the heating element 30 stops generating heat and the PCM pellets 52 store heat for later use.

To prevent the PCM pellets 52 from melting together while being heated, the PCM pellets 52 are made of cross-linked HDPE. Cross-linked HDPE pellets are HDPE pellets that have been exposed to a source of neutrons, thereby making its form stable. Suitable HDPE pellets include Alathon M-6210 pellets obtained from Cain Chemical Company, Houston, Tex., and a suitable facility for cross linking includes Nutron Products, Inc., Dickerson, Md.

To recover heat from the chamber 20, water is circulated through the tube 60 in direction A. Heat is transferred from the PCM pellets 52 to the viscous liquid 54 and from the viscous liquid 54 to the water in the tube 60. As heat is transferred from the PCM pellets 52 to the viscous liquid 54, the PCM pellets 52 begin to solidify, giving off latent heat of crystallization. Once the PCM pellets 52 have completely solidified, the temperature of the packed bed 50 begins to decrease until it is heated once again.

Referring to FIG. 3, the heating element 30 comprises a first member 32 having a distal end 34 and a second member 36 having a portion 38 extending around a portion of the distal end 34 of the first member 32. This configuration of the heating element 30, referring again to FIG. 1, allows more heat per unit time to be delivered to the lower portion 24 of the chamber 20 than to the upper portion 22. Thus, it is called a "variable heat flux heating element." The use of a variable heat flux heating element also counteracts the effects of vertical convection, thereby providing an additional way to deliver equal mounts of heat to the PCM pellets 52 in the lower portion 24 as to the PCM pellets 52 in the upper portion 22 of the chamber 20. Referring again to FIG. 3, the first member 32 and the second member 36 are held by a cap 42, which is used to secure the heating element 30 to the enclosure and an electrical power input 40.

Referring to FIG. 4, a filtering means, such as a wire mesh 70, is disposed around the heating element 30 to prevent the PCM pellets 52 from contacting the heating element 30. If the PCM pellets 52 were to directly contact the heating element 30 they would melt around the heating element 30, thereby reducing the heat transfer efficiency of the heater and possibly damaging the heating element 30.

The heat transfer coefficient in a packed pellet bed 50 may be approximated from the following equations:

$$\frac{h}{\rho c_p U} = \frac{1}{\epsilon} 0.455 \, Re_{D_p}^{-0.4} \, Pr^{-\frac{2}{3}}$$

with $$Re_{D_p} = \frac{\sqrt{\frac{A_p}{\pi}} \, U}{v}$$

where:

h=the convective heat transfer coefficient.
$c_p$=the specific heat of the fluid.
$\rho$=the fluid density.
U=the mean velocity of the fluid through the bed.
$\epsilon$=the bed void friction.
$A_p$=the particle surface area.
v=the fluid velocity.
Pr=the fluid Prandtl number.
$Re_{D_p}$=the Reynolds number.

In the present invention, the mean velocity is driven by natural convection and is thus controlled by the amount of heat input and the distribution of heat within the bed.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A storage heater for storing heat and for heating a fluid, comprising:
  a. an enclosure defining a chamber therein having a lower portion and an upper portion;
  b. a heating element disposed within the enclosure;
  c. a tube through which the fluid flows, having an inlet and an outlet, both being disposed outside of the enclosure, and having an intermediate portion interconnecting the inlet and the outlet that passes through the enclosure;
  d. a densely packed bed of phase change material pellets disposed within the enclosure; and
  e. a viscous liquid disposed within the enclosure, in thermal communication with the heating element, the phase change material pellets, and the intermediate portion of the tube, for transferring heat from the heating element to the pellets and for transferring heat from the pellets to the intermediate portion of the tube, the viscous fluid having a viscosity whereby the frictional pressure drop of the fluid in contact with the phase change material pellets substantially reduces vertical thermal convection in the fluid and so that as the fluid flows through the tube, heat is transferred from the viscous liquid to the fluid flowing through the intermediate portion of the tube, wherein the heating element is vertically disposed within the chamber and adapted to transfer heat to the lower portion of the chamber at a greater rate than to the upper portion of the chamber.

2. The storage heater of claim 1 further comprising means disposed in the chamber for creating eddy currents in the viscous liquid, thereby reducing thermal stratification within the enclosure.

3. The storage heater of claim 2 wherein the means for creating eddy currents comprises a plate laterally disposed in the lower portion of the chamber, the plate defining a plurality of openings passing therethrough and means disposed adjacent each opening to deflect the path of travel of the fluid as it passes through the opening.

4. The storage heater of claim 1, wherein the heating element comprises:
   a. a vertically disposed first member having a distal end; and
   b. a second member extending about a portion of the first member adjacent the distal end.

5. The storage heater of claim 1 further comprising filtering means disposed about at least a portion of the heating element for preventing the phase change material pellets from contacting the heating element while allowing the viscous fluid to pass therethrough to contact the heating element.

6. The storage heater of claim 5, wherein the filtering means comprises a wire mesh.

7. The storage heater of claim 1, wherein the intermediate portion of the tube comprises a coil disposed around at least a portion of the heating element.

8. The storage heater of claim 7, wherein the tube is helically disposed around the heating element.

9. The storage heater of claim 1, wherein the phase change material pellets comprise cross-linked high density polyethylene.

10. The storage heater of claim 1, wherein the densely packed bed comprises more than 40% phase change material by volume of the bed.

11. The storage heater of claim 10, wherein the densely packed bed comprises about 67% phase change material by volume of the bed.

12. The storage heater of claim 1, wherein the viscous fluid is propylene glycol.

13. The storage heater of claim 1, wherein the average diameter of the pellets is at least $5 \times 10^{-3}$ meters.

14. A storage heater for heating water, comprising:
   a. an insulated enclosure defining a chamber therein having an upper portion and a lower portion;
   b. a heating element disposed vertically within the chamber, comprising an elongated member having a top end and an opposite bottom end and adapted to produce a greater heat flux from the bottom end than from the top end;
   c. a heat recovery tube, through which water flows, having and inlet and an outlet, both being disposed outside of the enclosure, and an intermediate portion interconnecting the inlet and the outlet, the intermediate portion passing through the chamber;
   d. a packed bed of phase change material pellets disposed within the chamber;
   e. a viscous liquid disposed within the chamber, in thermal communication with the heating element, the phase change material pellets, and the intermediate portion of the tube, for transferring heat from the heating element to the pellets and for transferring heat from the pellets to the tube, so that as water flows through the tube heat is transferred from the viscous liquid to the water; the viscous fluid having a viscosity so that the frictional pressure drop of the fluid in contact with the phase change material pellets substantially reduces vertical thermal convection in the fluid
   f. a plate laterally disposed near the lower portion of the chamber for creating eddy currents in the viscous liquid, thereby enhancing radial heat transfer and reducing thermal stratification within the chamber; and
   g. a wire mesh, disposed around the heating element, which allows the viscous liquid to pass through the mesh and contact the heating element and which prevents the phase change material pellets from contacting the heating element.

15. The storage heater of claim 14, wherein the heat recovery tube comprises a coil passing through the chamber, helically disposed around the heating element.

16. The storage heater of claim 15, wherein the phase change material pellets comprise cross-linked high density polyethylene.

17. The storage heater of claim 15, wherein the viscous liquid comprises propylene glycol.

* * * * *